United States Patent [19]

Ibukuro

[11] Patent Number: 4,961,057
[45] Date of Patent: Oct. 2, 1990

[54] AUTOMATIC GAIN CONTROL AMPLIFIER FOR COMPENSATING CABLE LOSS

[75] Inventor: Sadao Ibukuro, Tokyo, Japan

[73] Assignee: Fujitsu Limited, Kawasaki, Japan

[21] Appl. No.: 289,049

[22] Filed: Dec. 23, 1988

[30] Foreign Application Priority Data

Dec. 24, 1987 [JP] Japan .................. 62-333856

[51] Int. Cl.$^5$ .................................... H03F 3/68
[52] U.S. Cl. ............................ 330/295; 330/254
[58] Field of Search ............ 330/84, 252, 254, 278, 330/295, 307, 124 D, 124 R

[56] References Cited

U.S. PATENT DOCUMENTS 4,792,744 12/1988 Antoine .................... 330/295 X

FOREIGN PATENT DOCUMENTS 0112884 1/1984 Japan .

OTHER PUBLICATIONS

Shigei, et al, "High Speed PCM" pp. 216–222, Corona.

Primary Examiner—Steven Mottola
Attorney, Agent, or Firm—Staas & Halsey

[57] ABSTRACT

An AGC amplifier for compensating a signal loss in a cable through which a signal having a frequency is passed, the signal loss being defined as a function of a square-root of the frequency, having a wide compensation ability and adaptable to the forming of a LSI circuit construction. The AGC amplifier includes a first amplifier (10) amplifying an input signal (IN) to be compensated at a first gain ($A_0$), a differential circuit (40) having a constant differential coefficient defined by the frequency, and differentiating the input signal at the differential coefficient, a second amplifier (20) amplifying the differentiated signal at a second gain ($A_1$), and an adding circuit (30) adding the amplified signals therefrom to output an output signal (OUT) in which the signal loss is compensated.

21 Claims, 9 Drawing Sheets

AUTOMATIC GAIN CONTROL AMPLIFIER FOR COMPENSATING CABLE LOSS

BACKGROUND OF THE INVENTION

1. Field of the Invention

The present invention relates to an automatic gain control (AGC) amplifier for compensating a cable loss, more particularly, to an AGC amplifier for compensating a cable loss, having a wide compensation ability and adaptable to the forming of a large scale integration (LSI) circuit construction.

2. Description of the Related Art

An equalizing amplifier system, which carries out a wave shaping of a pulse signal having an amplitude which is attenuated by a cable, for example, a coaxial cable or a paired-cable, to a pulse signal having a predetermined equalization characteristic, usually includes a build-out network (BON), a preamplifier, an AGC amplifier, a wave equalizer, a post-amplifier, a peak detector connected to the post-amplifier to detect a peak of an output from the post-amplifier, and a DC amplifier connected to the peak detector and supplying an amplified peak signal to the AGC amplifier.

The BON is an adjustment circuit enabling a level compensation at the AGC amplifier even when a cable relaying distance is short and thus an input level is too high. The preamplifier is a low noise amplifier for suppressing noise. The AGC amplifier compensates cable loss to restore an amplitude so that a gain thereof is controlled by the peak detector and the DC amplifier to restore a peak of a wave equalized at the equalizer. The equalizer equalizes the AGC amplified signal to form a signal having a predetermined wave characteristic, in accordance with a predetermined equalization function. The post-amplifier supplies a high level signal to a timing circuit and a discrimination and recovery circuit.

The present invention pertains to the AGC amplifier. A Bode type variable equalizer and modifications thereof are used as an AGC amplifier in a frequency division multiplexing (FDM) system, but a variable equalization range thereof is narrow, and accordingly, this type is not used for a pulse coded modulation (PCM) system. The present invention particularly relates to an AGC amplifier for compensating a cable loss in the PCM system.

Prior art AGC amplifiers, which will be described later, suffer from a narrow variable equalization range and a relatively bulky circuit size, and cannot be adapted to form an LSI circuit construction.

SUMMARY OF THE INVENTION

An object of the present invention is to provide an AGC amplifier for compensating a cable loss in a PCM system, and having a wide variable equalization range.

Another object of the present invention is to provide an AGC amplifier for compensating a cable loss in a PCM system, and able to be adapted for forming a LSI circuit construction.

Yet another object of the present invention is to provide an AGC amplifier for compensating a cable loss in a PCM system, by which the cable loss is easily compensated and having a simple circuit construction.

According to the present invention, there is provided an AGC amplifier for compensating a signal loss in a cable through which a signal having a frequency is passed, the signal loss being defined as a function of a square-root of the frequency. The AGC amplifier includes a first amplifier having a first gain, receiving an input signal to be compensated, and amplifying the input signal at the first gain; a differential circuit having a constant differential coefficient defined by the frequency, receiving the input signal, and differentiating the input signal at the differential coefficient; a second amplifier, operatively connected to the differential circuit, having a second gain and amplifying the differential signal at the second gain; and an adding circuit, operatively connected to the first and second amplifiers, adding the amplified signals therefrom to output an output signal in which the signal loss has been compensated.

The first amplifier may comprise a first gain change circuit for changing the first gain in response to a first gain control signal; a differential-operation type amplifying circuit including transistors; and a first operation point compensation circuit for rejecting an affect of a variation of base-emitter voltages of the transistors in the first differential-operation type amplifying circuit.

The second amplifier may comprise a second gain change circuit for changing the second gain in response to a second gain control signal; a differential operation type amplifying circuit including transistors; and a second operation point compensation circuit for rejecting an affect of a variation of base-emitter voltages of the transistors in the second differential operation type amplifying circuit.

The first and second amplifiers can be formed by a large scale integrated circuit.

The differential circuit may comprise a capacitor and a resistor designed to give the differential coefficient.

According to the present invention, there is also provided an AGC amplifier circuit including a plurality of the above AGC amplifiers connected in series, to give a continuous-compensation characteristic.

BRIEF DESCRIPTION OF THE DRAWINGS

Other objects and features of the present invention will be described in more detail with reference to the accompanying drawings, in which.

DESCRIPTION OF THE PREFERRED EMBODIMENTS

Before describing the preferred embodiments of the present invention, the principle of cable loss compensation will be described with reference to FIGS. 1a to 1c.

Figure 1A:
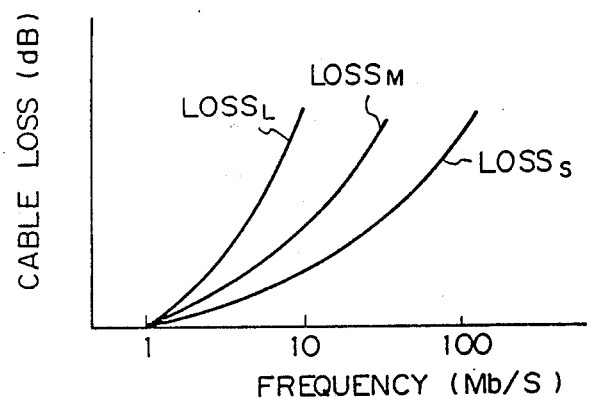
FIGS. 1a, 1b and 1c are graphs representing general characteristics of a gain equalization.

FIG. 1a shows a relationship between a frequency f (Megabits per second: Mb/s) on an abscissa of a logarithm scale and a cable loss LOSS (dB) on an ordinate. The cable loss LOSS depends upon a square root of the frequency f of a signal passing through a cable, for example, a coaxial cable, and a length l of the cable, and is expressed by the following formula (Re: Equation (6) in JP-A-No. 59-4335):

$$LOSS = \exp(A\sqrt{f} + Bf)l \quad (1)$$
$$\approx \exp(A\sqrt{f})l$$

where, A and B denote constants.

In FIG. 1a, curve $LOSS_L$ represents a cable loss when the length of the cable is long, curve $LOSS_S$ represents a loss when the length is short, and curve $LOSS_M$ represents a loss when the length is medium.

Figure 1B:
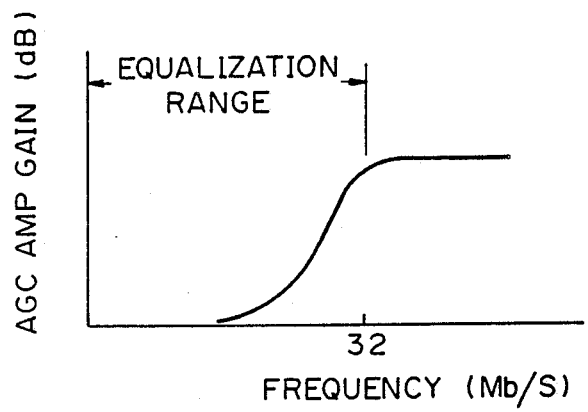
Figure 1C:
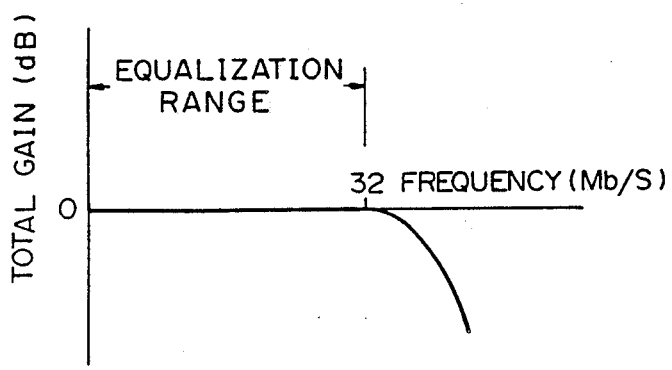

FIG. 1b is a graph showing a characteristic of a gain of an AGC amplifier for compensating the cable loss, for example, the cable loss shown by curve $LOSS_M$ in FIG. 1a. In FIG. 1b, an abscissa indicates the frequency (Mb/s) of a logarithm scale, and an ordinate indicates a gain (dB) of the AGC amplifier for compensating the cable loss. The AGC amplifier should compensate the cable loss within a predetermined equalization range. FIG. 1c is a graph representing a total gain compensated by the AGC amplifier.

In general, the AGC amplifier should compensate the cable loss in response to the frequency f and the length l, and within the predetermined equalization range.

Before describing the preferred embodiments of the present invention, prior art AGC amplifiers will be described.

Figure 2:
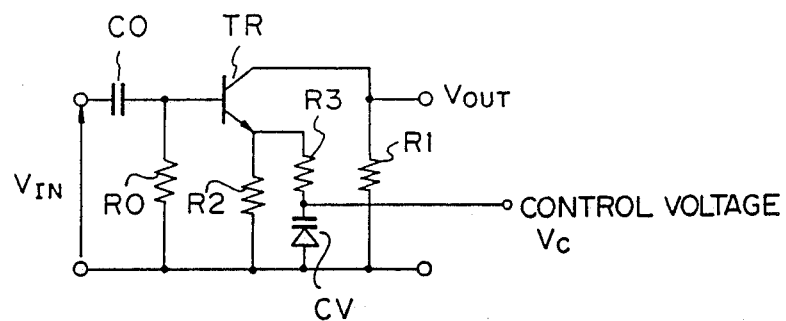
FIG. 2 is a circuit diagram of a basic prior art AGC amplifier for compensating a cable loss.
Figure 4:
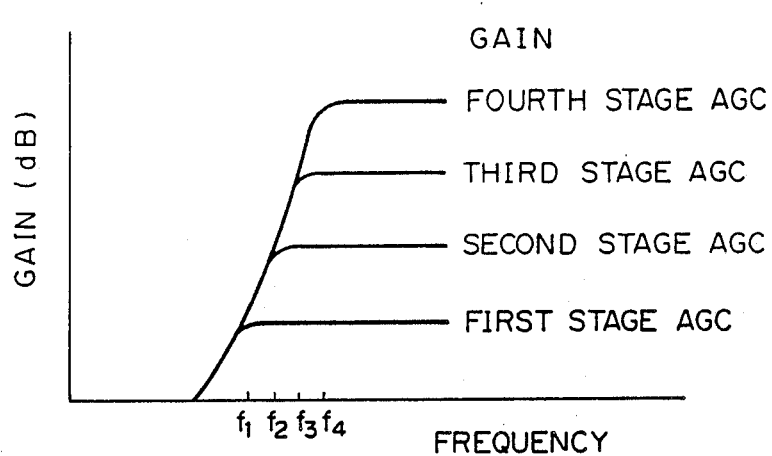
FIG. 4 is a graph representing a total gain equalization characteristic obtained by the circuit shown in FIG. 3.

FIG. 2 is a circuit diagram of a basic prior art AGC amplifier shown in FIG. 4.77 on page 218 of a publication titled "HIGH SPEED PCM", by Shigei et al., published on Feb. 10, 1975, CORONA Co., Ltd. The AGC amplifier consists of a DC component cutting capacitor C0, a transistor TR, resistors R0 to R3 having resistances R0 to R3, respectively, and a variable capacitor CV having a capacitance C which is varied in response to a control voltage $V_C$. A frequency characteristic A(f) of the AGC amplifier can be approximately expressed by the following formula:

$$A(f) = \frac{R1}{R2} \cdot \frac{1 + j\omega C(R1 + R3)}{1 + j\omega C \cdot R3} \quad (2)$$

where, $\omega = 2\pi f$

The frequency characteristic is the same in a hyperbolic first-order form wherein, in a bridge T type circuit, an impedance $Z_a$ thereof is sL or $1/sC$ ($s = j\omega$). Accordingly, by combining the AGC amplifiers, more specifically, by a cascade-connection of a plurality of the AGC amplifiers of FIG. 2 and a suitable selection of parameters, an AGC amplifier for compensating a cable loss, which is expressed by a function of a square root of the frequency, can be realized.

Figure 3:
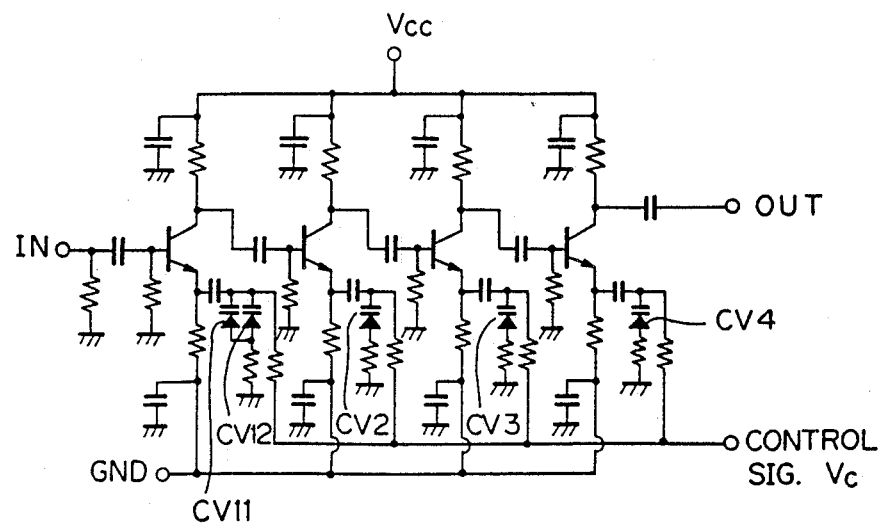
FIG. 3 is a circuit diagram of a prior art AGC amplification circuit as a combination of the circuits shown in FIG. 2.

FIG. 3 is a circuit diagram of such a combined AGC amplifier (Re: FIG. 4.78 in the above-mentioned publication). The AGC amplifier circuit shown in FIG. 3 consists of four tandem-connected AGC amplifiers each corresponding to the AGC amplifier in FIG. 2. FIG. 4 is a graph representing a gain of the AGC amplifier circuit shown in FIG. 3, and corresponds to FIG. 1a.

Assuming that the cable loss is varied from a standard loss (a $\sqrt{f}$) by ($\Delta a \sqrt{f}$), a gain G(f) necessary for the AGC amplifier circuit is expressed by the following formula:

$$G(f) = G_O + a\sqrt{f} + \Delta a\sqrt{f} \quad (3)$$
$$= G_O + \sqrt{\left(1 + \frac{\Delta a}{a}\right)^2 \cdot f}$$

This is equivalent to a parallel shift by $(1 + \Delta a/a)^2$ of the frequency characteristic along the frequency axis. The parallel shift of the frequency characteristic can be realized by simultaneously shifting all poles and all zero points, and thus can be achieved by changing the capacitances of the variable capacitors CV11 and CV12 to CV4 shown in FIG. 3 to which a control voltage $V_C$ is supplied.

Figure 5:
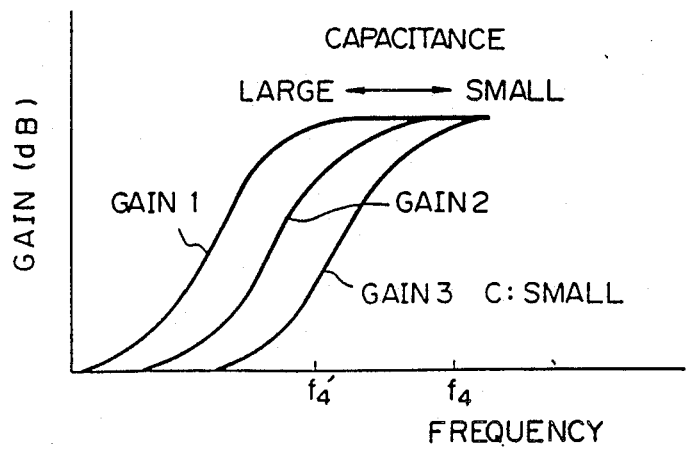
FIG. 5 is a graph representing a change of a gain equalization of the prior art.

FIG. 5 is a graph showing the shift operation. Curves GAIN1 to GAIN3 show gains (dB) on an abscissa of the AGC amplifier circuit of FIG. 3 when the capacitances of the variable capacitors are changed at a same ratio.

The AGC amplifier circuit shown in FIG. 3 is an example used in a PCM repeater having a frequency of 400 (Mb/s). The capacitance of the variable capacitors can be varied between 5 to 30 pF, and have a variable gain range of 15 (dB).

The above AGC amplifier circuit has the following defects. First, since the capacitance variable range is based on a multiple of 6, the equalization range is narrow and cannot be commonly used for a communication system in which cables having a variety of lengths are used. Second, since the variable capacitors having large capacitances cannot be easily formed in LSI chip, the AGC amplifier circuit shown in FIG. 3 can not be adapted to form the LSI chip. In addition, the AGC amplifier circuit requires many resistors, and thus can not be adapted to form the LSI chip. Third, the AGC amplifier circuit is relatively complex.

JP-A-No. 59-4335 discloses a variable gain amplification circuit including a circuit having a characteristic of a square root of a frequency. The variable gain amplification circuit realizes a high compensation and has a wide equalization range, but uses two variable capacitors in each AGC amplifier, and thus still cannot be used when forming the LSI chip.

The present invention will now be described.

Figure 6:
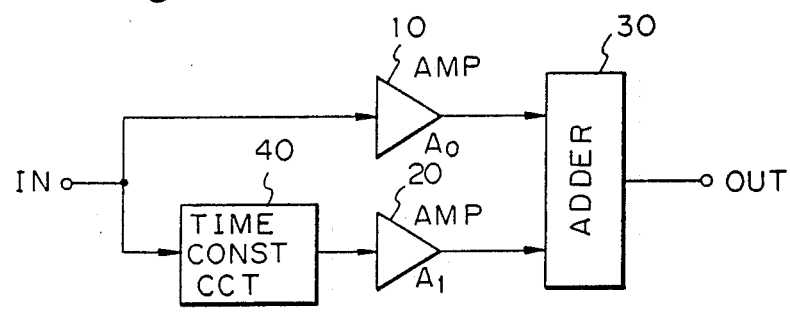
FIG. 6 is a block diagram of an AGC amplifier for compensating a cable loss in accordance with the present invention.

FIG. 6 is a block diagram of an AGC amplifier circuit for compensating a cable loss in accordance with the present invention.

In FIG. 6, the AGC amplifier circuit includes a first amplifier 10, a differential circuit (or a low frequency range cut-off circuit) 40, a second amplifier 20, and an adder 30. The AGC amplifier circuit can be provided in a PCM repeater, and an input signal IN, which is attenuated by a cable, is supplied to the amplifier 10 and the differential circuit 40.

The operation of the AGC amplifier circuit shown in FIG. 6 will be described. Referring back to formula (2), this formula can be rewritten as follows:

$$T(s) = \frac{R1}{R2} \times \frac{1 + sC(R1 + R3)}{1 + sCR3} \quad (4.1)$$

$$= A_0 \times \frac{1 + sC\tau_2}{1 + s\tau_1}$$

where, $A_0 = R1/R2$
$s = j\omega$
$\tau_1 = CR$
$\tau_2 = C(R1 + R3)$

The equation (4.1) is modified as follows:

$$T(s) = A_0 \frac{1 + s\tau_1 + s(\tau_2 - \tau_1)}{1 + s\tau_1} \quad (4.2)$$

$$= A_0 \left[ 1 + \frac{s\tau_1 (\tau_2 - \tau_1)/\tau_1}{1 + s\tau_1} \right]$$

$$T(s) = A_0 + A_1 \frac{s\tau_1}{1 + s\tau_1} \quad (4.3)$$

Figure 7:
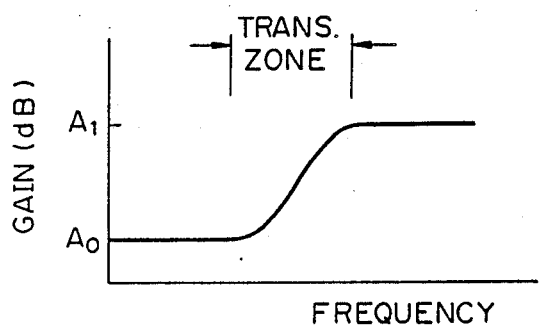
FIGS. 7 and 8 are graphs representing the basic operation of the AGC amplifier shown in FIG. 6.

FIG. 7 is a graph showing the characteristic of the equation (4.3). In FIG. 7, an abscissa indicates a frequency f or s of a logarithm scale, and an ordinate indicates a gain (dB). A transition zone is expressed by the term $s\tau_1/(1+s\tau_1)$ in the formula (4.3).

Obtaining an absolute value of the second term in the formula (4.3).

$$A_1 \left| \frac{s\tau_1}{1 + s\tau_1} \right| = A_1 \frac{|s\tau_1|}{\sqrt{1 + (s\tau_1)}} \quad (5.1)$$

Considering a frequency range of $0 < s\tau_1 < 1$, a development of a Malaurin's series to the formula (5.1) is carried out:

$$A_1, \frac{|s\tau_1|}{1 - \frac{1}{2}(s\tau_1)^2 + \ldots} \quad (5.2)$$

Furthermore, a first-order approximation is applied to the formula (5.2), and the following formula is obtained:

$$A_1|s\tau_1| = A_1(2\pi f\tau_1) \quad (6)$$

Figure 8:
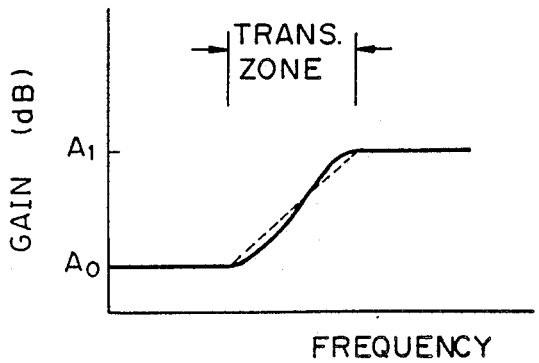

The formula (6) shows that the second term in the formula (4.3) is briefly expressed by a dotted linear line as shown in FIG. 8 in a narrow frequency range which actually required the compensation.

Accordingly, the formula (4.3) is expressed as follows:

$$T(s) = A_0 + A_1 \cdot s\tau_1 \quad (7)$$

Referring back to FIG. 6, the amplifier 10 has a gain $A_0$, the differential circuit 40 has a differential coefficient (a time constant) $\tau_1$, and the amplifier 20 has a gain $A_1$. The adder 30 adds the first term component and the second term component in the formula (7).

Figure 9:
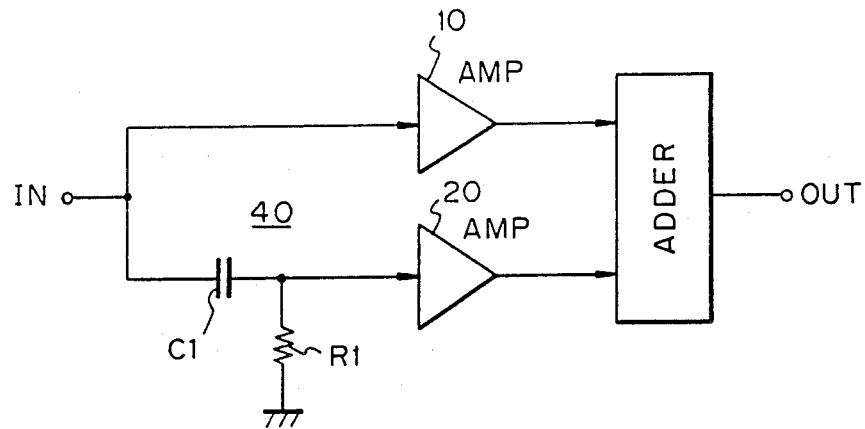
FIG. 9 is a circuit diagram of an embodiment of the AGC amplifier of FIG. 6.

In FIG. 6, the amplifiers 10 and 20 and the adder 30 can be easily formed by an LSI technology. The differential circuit 40 can be formed by a conventional differential circuit consisting of a capacitor C1 and a resistor R1, as shown in FIG. 9. Note, that the differential coefficient $\tau_1$ is constant, and accordingly, a variation of the capacitance of the capacitor C1 is not required. The gain $A_1$ of the amplifier 20 should be varied in response to a length of the cable, and can be easily carried out in a conventional manner. The capacitance of the capacitor C1 in FIG. 9 may be approximately several tens pico Farad (pF). In FIG. 9, the amplifiers 10 and 20 and the adder 30 can be easily formed in a single LSI chip, but the differential circuit 40 is provided outside of the LSI chip.

Figure 10:
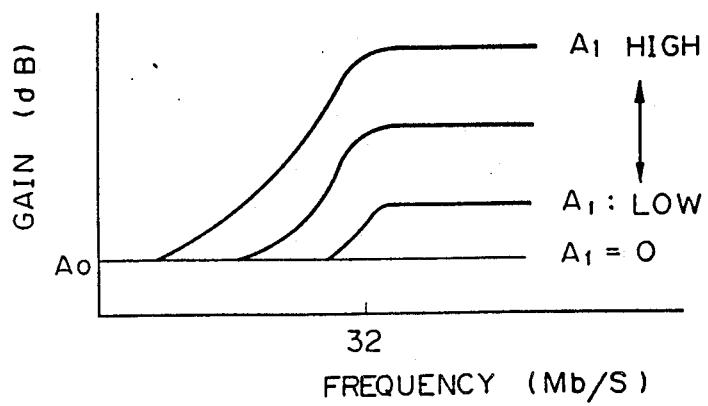
FIG. 10 is a graph representing a change of a total gain of the AGC amplifier shown in FIG. 9.

FIG. 10 shows a change of the total gain of the AGC amplifier shown in FIG. 9 by changing the gain $A_1$ of the amplifier 20. Note, that the gain $A_1$ is changed in FIG. 10, but the capacitance of the capacitor C1 in the differential circuit 40 is not changed.

Figure 16:
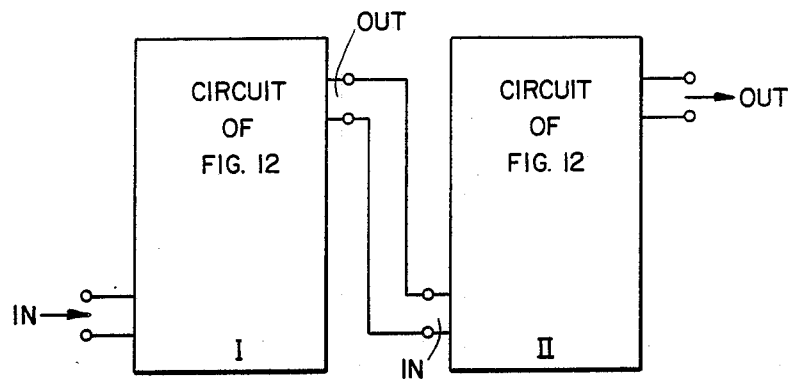
FIG. 16 illustrates series connected amplifiers.

By connecting the AGC amplifier shown in FIG. 9 in series, as for the circuits shown in FIGS. 2 and 3 and as shown in FIG. 16, a desired gain characteristic can be obtained as shown in FIG. 4.

Figure 11:
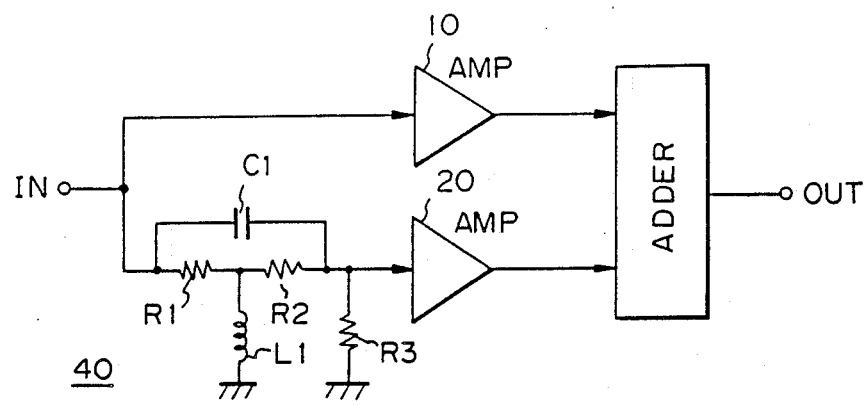
FIG. 11 is a circuit diagram of another embodiment of the AGC amplifier of FIG. 6.

FIG. 11 shows a circuit diagram of another embodiment of the AGC amplifier of FIG. 6, and corresponds to FIG. 9. In FIG. 11, the differential circuit 40 is formed by a well known constant resistance circuit. The constant resistance circuit comprises a capacitor C1 having a capacitance C1, resistors R1 to R3 each having a resistance R, and an inductor L1 having an inductance L1. In FIG. 11, $L_1/C_1 = R^2$, and a total impedance $Z = R$.

Figure 12:
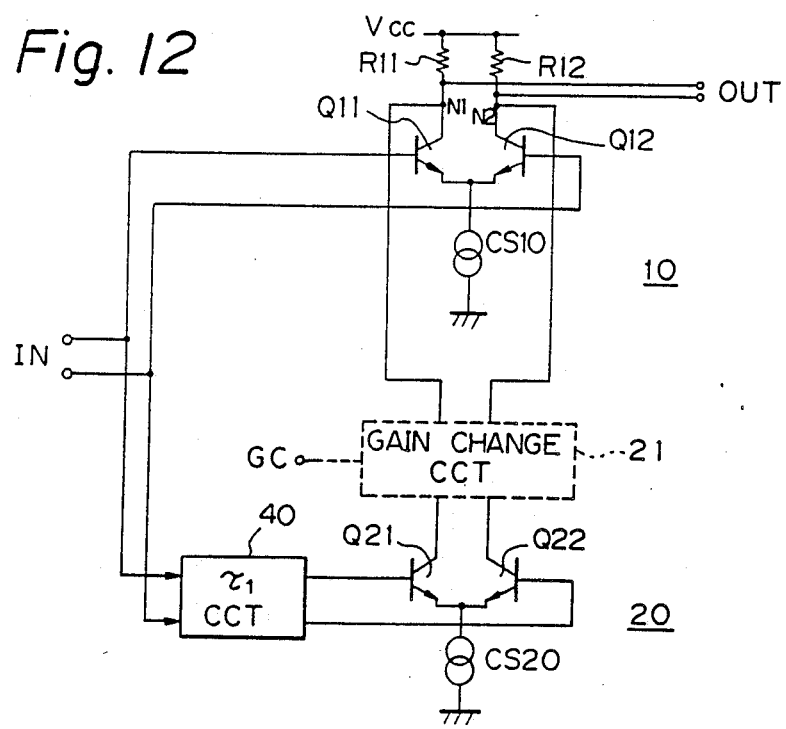
FIGS. 12 and 13 are circuit diagrams of AGC amplifiers of the present invention; and, FIGS. 14 and 15 are graphs of actual cable loss curves and actual cable loss compensation curves.

FIG. 12 is a circuit diagram of a specific AGC amplifier of the present invention. In FIG. 12, the amplifiers 10 and 20 shown in FIG. 9 or 11 are formed by differential-operation type amplifiers, and the adder 30 shown in FIG. 9 or 11 has current adding points N1 and N2. For example, the amplifier 10 includes a pair of transistors Q11 and Q12, a constant current source CS10, and load resistors R11 and R12 connected to a power supply $V_{CC}$. The AGC amplifier shown in FIG. 12 does not have a gain changing circuit for changing the gain $A_0$ and/or $A_1$, but the change of the gain, for example, $A_1$, can be easily realized by adding a gain changing circuit 21 consisting of control transistors and supplied with a gain control signal GC, as shown by dotted lines.

In FIG. 12, the differential coefficient $\tau_1$ of the differential circuit 40 is determined by the frequency f and expressed by the following relationship:

$$2\pi\tau_1 f = 1$$

When the frequency f is 32 MHz or Mb/s, the time constant $\tau_1 = 0.05 \mu S$.

To obtain the total gain characteristics as shown in FIG. 4, a predetermined number of the AGC amplifiers shown in FIG. 12 should be combined as illustrated in FIG. 16.

Figure 13:
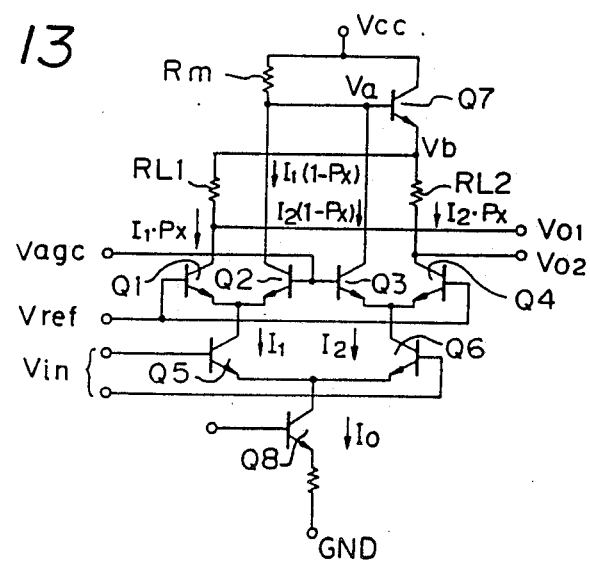

FIG. 13 is a circuit diagram of another specific amplifier used for the amplifiers 10 and 20. In FIG. 13, the amplifier includes gain control transistors Q1 to Q4, a pair of differential-operation transistors Q5 and Q6, a transistor Q8 for a constant current source, and load resistors RL1 and RL2. An input signal Vin is supplied to the bases of the transistors Q5 and Q6; a reference voltage Vref is supplied to the bases of the transistors Q1 and Q4; and a gain control signal Vagc is supplied to the bases of the transistors Q2 and Q3.

In FIG. 13, an operational point compensation circuit consisting of a resistor Rm and a transistor Q7 is further provided. The operation of the operational point compensation circuit will be described.

An output voltage Vo is expressed as follows:

$$Vo = Vb - I1 \cdot Px \cdot R1 \qquad (8.1)$$

where,
Px denotes a gain change parameter, and
R1 denotes a resistance of the load resistor RL1 or RL2.

$$Vb = Va - Vbe \qquad (8.2)$$

where,
Vbe denotes a base-emitter voltage of the transistor.

$$Va = Vcc - (I1 \cdot (1-Px) + I2 \cdot (1-Px))Rm \qquad (8.3)$$

Substituting the relationship: I1=I2=I0/2 in the formula (8.3), an output operational point Vo1(DC) of an output Vo1 is expressed as follows:

$$Vo1(DC) = Vcc - Vbe - I0 \cdot R1/2 \qquad (9)$$

As seen from the formula (9), the output operational point Vo1(DC) does not depend upon the gain parameter Px, but only upon a variation of the base emitter voltage, and thus the amplifier shown in FIG. 13 is very stable.

A gain of the amplifier shown in FIG. 13 is expressed by the following formula:

$$G = I0 \cdot R1/(2 \cdot Vt(1 + \exp(Vid/Vt))) \qquad (10)$$

where,
$Vt = kT/q$
$Vid = Vagc - Vref$

Figure 14:
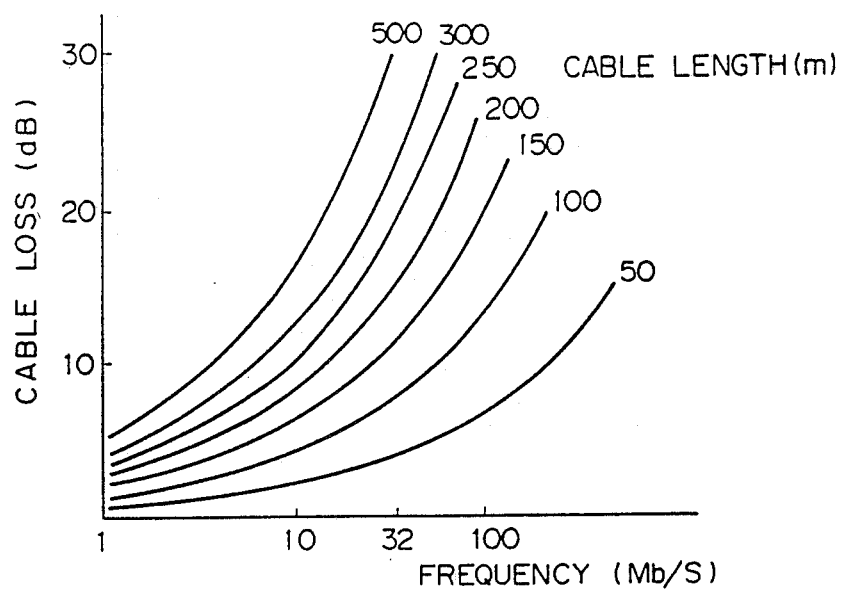
Figure 15:
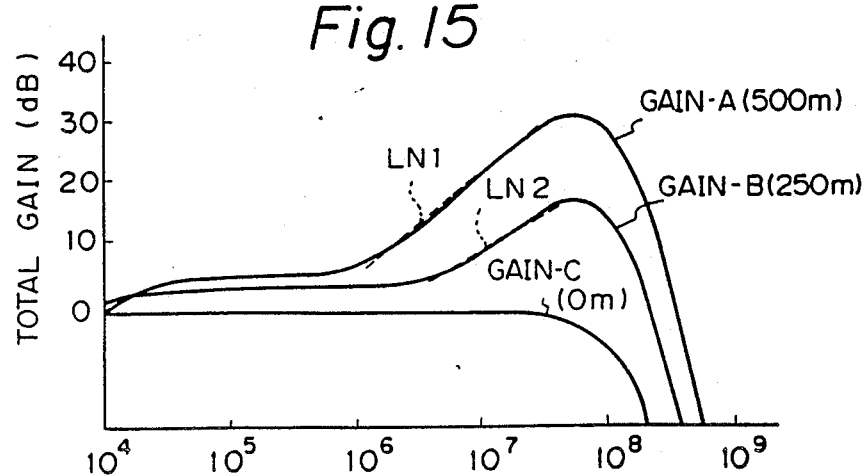

FIG. 14 shows actual attenuation (cable loss) characteristics, and FIG. 15 shows actual compensation characteristics obtained by the AGC amplifier shown in FIG. 13. In FIG. 15, dotted lines LN1 and LN2 indicate an approximate compensation obtained by the time constant circuit. Curves GAIN-A, GAIN-B, and GAIN-C show total gains when the cable length is 500 m, 250 m, and 0 m, respectively.

Many widely different embodiments of the present invention may be constructed without departing from the spirit and scope of the present invention. It should be understood that the present invention is not limited to the specific embodiments described in this specification, except as defined in the appended claims.

I claim:

1. An automatic gain control amplifier for compensating a signal loss in a cable through which a signal having a frequency is passed, the signal loss being defined as a function of a square-root of the frequency, comprising:
   a first amplifier having a first gain, receiving an input signal to be compensated and amplifying said input at said first gain;
   a differential circuit having a constant differential coefficient defined by said frequency, receiving said input signal, and differentiating said input signal by said differential coefficient, and comprising:
   a capacitor receiving the input signal; and
   a resistor connected to said capacitor, said resistor and capacitor providing the constant differential coefficient;
   a second amplifier, operatively connected to said resistor and capacitor of said differential circuit, having a second gain and amplifying said differential signal at said second gain; and
   an adding circuit, operatively connected to said first and second amplifiers, adding said amplified signals therefrom to output an output signal in which said signal loss is compensated.

2. An automatic gain control amplifier according to claim 1, wherein said first amplifier comprises a first gain change circuit for changing said first gain in response to a first gain control signal.

3. An automatic gain control amplifier according to claim 2, wherein said first amplifier comprises a differential-operation type amplifying circuit including transistors.

4. An automatic gain control amplifier for compensating a signal loss in a cable through which a signal having a frequency is passed, the signal loss being defined as a function of a square-root of the frequency, comprising:
   a first amplifier having a first gain, receiving an input signal to be compensated and amplifying said input signal at said first gain, said amplifier comprising:
   a first gain change circuit for changing said first gain in response to a first gain control signal;
   a differential-operation type amplifying circuit including transistors; and
   a first operation point compensation circuit for overcoming an affect of a variation of base-emitter voltages of said transistors in said first differential-operation type amplifying circuit;
   a differential circuit having a constant differential coefficient defined by said frequency, receiving said input signal, and differentiating said input signal responsive to said differential coefficients;
   a second amplifier, operatively connected to said differential circuit, having a second gain and amplifying said differentiated signal at said second gain; and
   an adding circuit, operatively connected to said first and second amplifiers, adding said amplified signals therefrom to output an output signal in which said signal loss is compensated.

5. An automatic gain control amplifier according to claim 4, wherein said second amplifier comprises a second gain change circuit for changing said second gain in response to a second gain control signal.

6. An automatic gain control amplifier according to claim 5, wherein said second amplifier comprises a differential-operation type amplifying circuit including transistors.

7. An automatic gain control amplifier according to claim 6, wherein said second amplifier comprises a second operation point compensation circuit for overcoming an effect of a variation of base-emitter voltages of said transistors in said second differential-operation type amplifying circuit.

8. An automatic gain control amplifier according to claim 7, wherein said first and second amplifiers are formed by a large scale integrated circuit.

9. An automatic gain control amplifier according to claim 8, wherein said differential circuit comprises a capacitor and a resistor, said capacitor and said resistor giving said differential coefficient.

10. An automatic gain control amplifier according to claim 1, wherein said first amplifier comprises a differential-operation type amplifying circuit including transistors.

11. An automatic gain control amplifier for compensating a signal loss in a cable through which a signal having a frequency is passed, the signal loss being defined as a function of a square-root of the frequency, comprising:
a first amplifier having a first gain, receiving an input signal to be compensated and amplifying said input signal at said first gain, said first amplifier comprising:
a differential-operation type amplfying circuit including transistors; and
a first operation point compensation circuit for overcoming an affect of a variation of base-emitter voltages of said transistors in said first differential-operation type amplifying circuit;
a differential circuit having a constant differential coefficient defined by said frequency, receiving said input signal, and differentiating said input signal responsive to said differential coefficient;
a second amplifier, operatively connected to said differential circuit, having a second gain and amplifying said differential signal at said second gain; and
an adding circuit, operatively connected to said first and second amplifiers, adding said amplified signals therefrom to output an output signal in which said signal loss is compensated.

12. An automatic gain control amplifier according to claim 11, wherein said second amplifier comprises a second gain change circuit for changing said second gain in response to a second gain control signal.

13. An automatic gain control amplifier according to claim 12, wherein said second amplifier comprises a differential-operation type amplifying circuit including transistors.

14. An automatic gain control amplifier according to claim 13, wherein said second amplifier comprises a second operation point compensation circuit for overcoming an effect of a variation of base-emitter voltages of said transmitters in said second differential-operation type amplifying circuit.

15. An automatic gain control amplifier according to claim 14, wherein said first and second amplifiers are formed by a large scale integrated circuit.

16. An automatic gain control amplifier according to claim 15, wherein said differential circuit comprises a capacitor and a resistor, said capacitor and said resistor giving said differential coefficient.

17. An automatic gain control amplifier according to claim 10, wherein said second amplifier comprises a differential-operation type amplifying circuit including transistors.

18. An automatic gain control amplifier for compensating a signal loss in a cable through which a signal having a frequency is passed, the signal loss being defined as a function of a square-root of the frequency, comprising:
a first amplifier having a first gain, receiving an input signal to be compensated and amplifying said input signal at said first gain, said first amplifier comprising a differential-operation type amplifying circuit including transistors;
a differential circuit having a constant differential coefficient defined by said frequency, receiving said input signal, and differentiating said input signal responsive to said differential coefficient;
a second amplifier, operatively connected to said differential circuit, having a second gain and amplifying said differentiated signal at said second gain, said second amplifier circuit comprising:
a differential-operation type amplifying circuit including transistors; and
a second operation point compensation circuit for overcoming an affect of a variation of base-emitter voltages of said transistors in said second differential-operation type amplfying circuit; and
an adding circuit, operatively connected to said first and second amplifiers, adding said amplified signals therefrom to output an output signal in which said signal loss is compensated.

19. An automatic gain control amplifier according to claim 18, wherein said first and second amplifiers are formed by a large scale integrated circuit.

20. An automatic gain control amplifier according to claim 19, wherein said differential circuit comprises a capacitor and a resistor, said capacitor and said resistor giving said differential coefficient.

21. An automatic gain control amplifier circuit according to claim 1, comprising a plurality of said automatic gain control amplifiers connected in series to give a continuous-compensation characteristic.

* * * * *

UNITED STATES PATENT AND TRADEMARK OFFICE
CERTIFICATE OF CORRECTION

PATENT NO. : 4,961,057

DATED : October 2, 1990

INVENTOR(S) : Sadao Ibukuro

It is certified that error appears in the above-identified patent and that said Letters Patent is hereby corrected as shown below:

Col. 2, line 43, "1a, 1b and 1c" s/b --1a to 1c--;

line 68, delete "and,".

Col. 3, line 11, "f" s/b --$\underline{f}$--;

line 15, "f" s/b --$\underline{f}$--;

line 16, "1" s/b --$\ell$--;

line 20, in the formula "1" s/b --$\ell$--;

line 22, "≈" s/b --=--, "1" s/b --$\ell$--;

line 40, "f" s/b --$\underline{f}$--;

line 41, "1" s/b --$\ell$--.

Col. 4, line 47, "can not" s/b --cannot--.

Col. 5, line 32, "f or s" s/b --$\underline{f}$ or $\underline{s}$ --.

UNITED STATES PATENT AND TRADEMARK OFFICE
CERTIFICATE OF CORRECTION

PATENT NO. : 4,961,057

DATED : October 2, 1990

INVENTOR(S) : Sadao Ibukuro

It is certified that error appears in the above-identified patent and that said Letters Patent is hereby corrected as shown below:

Col. 6, line 51, "f" s/b --$\underline{f}$--.

Col. 7, line 64, before "at" insert --signal--;

line 68, after "nal" insert --responsive to--, delete "by".

Col. 8, line 8, "tial" s/b --tiated--;

line 40, "coefficients" s/b --coefficient--;

line 60, "effect" s/b --affect--.

Signed and Sealed this

Fourteenth Day of July, 1992

*Attest:*

DOUGLAS B. COMER

*Attesting Officer*    Acting Commissioner of Patents and Trademarks